Figure 1:
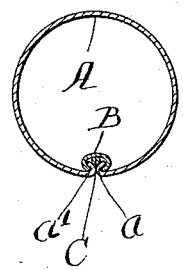

(No Model.)

D. C. STOVER.
METHOD OF MAKING SHEET METAL TUBING.

No. 575,862. Patented Jan. 26, 1897.

Witnesses:

Inventor:
Daniel C. Stover,
by Niles, Greene & Dilmer
Attys.

UNITED STATES PATENT OFFICE.

DANIEL C. STOVER, OF FREEPORT, ILLINOIS, ASSIGNOR TO THE STOVER BICYCLE MANUFACTURING COMPANY, OF SAME PLACE.

METHOD OF MAKING SHEET-METAL TUBING.

SPECIFICATION forming part of Letters Patent No. 575,862, dated January 26, 1897.

Application filed December 16, 1895. Serial No. 572,308. (No specimens.)

*To all whom it may concern:*

Be it known that I, DANIEL C. STOVER, a citizen of the United States of America, residing at Freeport, in the county of Stephenson and State of Illinois, have invented certain new and useful Improvements in the Manufacture of Sheet-Metal Tubing, of which the following is a specification.

My invention consists of certain improvements in the art of making bicycle-tubing and the like from sheet metal, and particularly in the method of uniting the meeting edges of the tube-sheet to form the lateral seam or joint.

The drawings consist of two figures, both of which show transverse sections of a piece of tubing illustrating my invention.

Referring to the drawings, A is a piece or strip of metal bent into tubular form and having its edges $a$ $a'$ turned inward and backward upon themselves.

B is a narrower piece of sheet metal also bent into tubular form with its edges sufficiently apart to enable it to be slipped over the hooked edges of the large tube, as seen in Figure 1.

Figure 2:
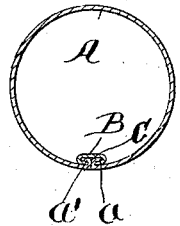

C is a wire made of spelter or other suitable material adapted to unite the joint by the application of heat, and said wire is inserted along with a suitable flux in the space between the small tube B and the edges of the large tube A, as seen in the drawings. As a wire composed of such material is necessarily soft and pliable, the preferred way of getting it into the place is to stretch it along the inside of the small tube B, turn the ends of the wire over the ends of the tube, and then crowd the latter into place. Pressure is then applied to the joint and the latter crowded down into compact form, as seen in Fig. 2, forcing the spelter to shape itself to the opening in which it lies. The tube may now be heated in a suitable oven, or by any means, and the spelter will flow through the joint and when cool will securely unite the same.

The advantages of my invention are the complete distribution of the spelter through the joint, which is impossible if the same is applied in the ordinary manner from the outside, and the fact that the spreading of the spelter upon the outer surface of the tubing is avoided, which is a saving of the time and labor ordinarily necessary to remove the same before the tubing can be enameled.

I claim as new and desire to secure by Letters Patent—

The method of uniting the meeting edges of a sheet-metal tube which consists in bending the edges inwardly and back upon themselves, slipping over said edges a retaining-strip adapted to embrace the same, inserting between the strip and the edges spelter or other suitable solder in a solid form, forcing the strip and edges down into compact shape by means of pressure and heating the joint; substantially as described.

DANIEL C. STOVER.

Witnesses:
C. H. GUND,
H. H. ANTRIM.